United States Patent
Leonov et al.

(10) Patent No.: US 9,685,244 B2
(45) Date of Patent: Jun. 20, 2017

(54) ACTIVE ZONE OF LEAD-COOLED FAST REACTOR

(71) Applicant: STATE ATOMIC ENERGY CORPORATION "ROSATOM" ON BEHALF OF THE RUSSIAN FEDERATION, Moscow (RU)

(72) Inventors: Viktor Nikolaevich Leonov, Moscow (RU); Aleksandr Viktorovich Lopatkin, Moscow (RU); Elena Aleksandrovna Rodina, Moscow (RU); Yuriy Vasilievich Chernobrovkin, Moscow (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 0 days.

(21) Appl. No.: 15/112,578

(22) PCT Filed: Nov. 27, 2014

(86) PCT No.: PCT/RU2014/000897
§ 371 (c)(1),
(2) Date: Jul. 19, 2016

(87) PCT Pub. No.: WO2015/115931
PCT Pub. Date: Aug. 6, 2015

(65) Prior Publication Data
US 2016/0351278 A1    Dec. 1, 2016

(30) Foreign Application Priority Data
Jan. 31, 2014 (RU) ................ 2014103266

(51) Int. Cl.
G21C 1/02    (2006.01)
G21C 3/04    (2006.01)
(Continued)

(52) U.S. Cl.
CPC ............... G21C 3/04 (2013.01); G21C 1/02 (2013.01); G21C 3/42 (2013.01); G21C 3/58 (2013.01);
(Continued)

(58) Field of Classification Search
CPC .......... G21C 3/04; G21C 1/022; G21C 1/024; Y02E 30/34; Y02E 30/35; Y02E 30/38
(Continued)

(56) References Cited

U.S. PATENT DOCUMENTS 3,367,837 A    2/1968  Nims et al.
3,575,803 A *  4/1971  Greebler ............... G21C 1/024
                                                376/172
(Continued)

FOREIGN PATENT DOCUMENTS

RU    2142169 C1    11/1999
RU    2173484 C1    9/2001

OTHER PUBLICATIONS

BNFL, "Advanced Reactors with Innovative Fuels", OECD Nuclear Energy Agency, Oct. 2001, pp. 135-145.*
(Continued)

Primary Examiner — Jack W Keith
Assistant Examiner — Daniel Wasil
(74) Attorney, Agent, or Firm — Harness, Dickey & Pierce, PLC

(57) ABSTRACT

An active zone includes a homogeneous uranium-plutonium nitride fuel, the mass fraction of which is a minimum 0.305, and consists of central, intermediate and peripheral parts which form fuel assemblies comprising fuel elements with
(Continued)

geometrically identical shells but differing heights. The radial distribution of the fuel across the volume of the active zone has a stepped shape. The radius of the central part is from 0.4 to 0.5 of the effective active zone radius, while the height of the fuel column in the fuel elements in the central part is from 0.5 to 0.8 of the height of the fuel column in the peripheral part. The heights of the fuel columns forming a stepped intermediate part for diameters ranging from 0.5 to 0.85 of the effective active zone diameter are within the range from 0.55 to 0.9 of the height of the fuel column in the peripheral part.

1 Claim, 1 Drawing Sheet

(51) Int. Cl.
    *G21C 3/42*     (2006.01)
    *G21C 5/14*     (2006.01)
    *G21C 3/58*     (2006.01)

(52) U.S. Cl.
    CPC ............... *G21C 5/14* (2013.01); *G21C 1/022* (2013.01); *G21C 2003/045* (2013.01); *G21Y 2002/50* (2013.01); *G21Y 2004/10* (2013.01); *G21Y 2004/30* (2013.01); *Y02E 30/34* (2013.01); *Y02E 30/35* (2013.01); *Y02E 30/38* (2013.01)

(58) Field of Classification Search
    USPC ......................................... 376/171, 172, 435
    See application file for complete search history.

(56) References Cited

U.S. PATENT DOCUMENTS

| | | | | |
|---|---|---|---|---|
| 3,736,225 A | * | 5/1973 | Barker | G21C 1/024 376/174 |
| 3,912,583 A | * | 10/1975 | Iljunin | G21C 1/024 376/172 |
| 3,943,036 A | * | 3/1976 | Ziegler | G21C 1/024 376/174 |

OTHER PUBLICATIONS

Adamov, "Naturally Safe Lead-Cooled Fast Reactor for Large-Scale Nuclear Power", Moscow 2001, pp. 93-100 and 169-171.*
Emelianov I. IA. et al, "Konstruirovaniya yadernykh reaktorov", Moscow, Energoizdat, 1982, p. 150.
International Search Report for PCT/RU2014/000897 with English Translation, ISA/RU, mailed Apr. 16, 2015.
Written Opinion of ISA for PCT/RU2014/000897 with English Translation, ISA/RU, mailed Apr. 16, 2015.

* cited by examiner

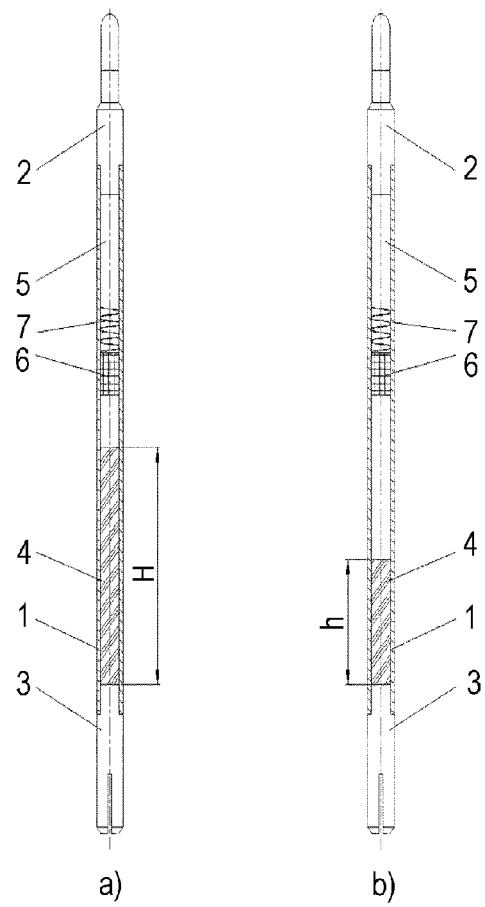
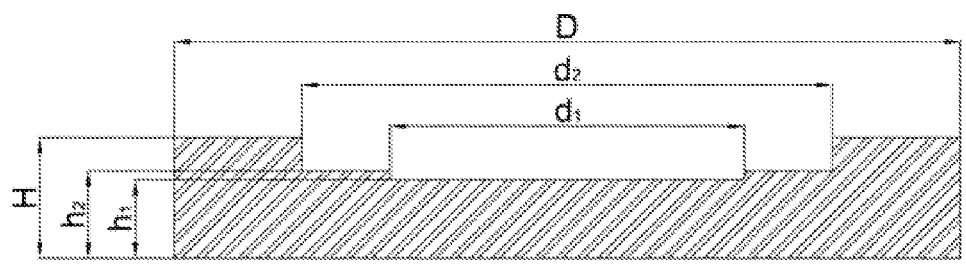
Fig. 2

ACTIVE ZONE OF LEAD-COOLED FAST REACTOR

CROSS-REFERENCE TO RELATED APPLICATIONS

This application is a 371 U.S. National Stage of International Application No. PCT/RU2014/000897, filed Nov. 27, 2014, which claims the benefit of and priority to Russian Patent Application No. RU 2014103266, filed Jan. 31, 2014. The entire disclosures of each the above applications are incorporated by reference herein.

FIELD OF THE INVENTION

The present invention relates to a nuclear technology and is intended for use in fast reactors with liquid-metal coolant, primarily in the form of molten lead and alloys thereof.

BACKGROUND OF THE INVENTION

Long-term development of nuclear energetics is associated with production of fast power reactors that can allow solving crucial problems of effective and safe usage of nuclear fuel upon closure of the nuclear fuel cycle and providing environmental safety. Ongoing efforts include the development of new generation lead-cooled fast reactors having uranium-plutonium nitride fuel. The problem of essential design concept selection and provision of such nuclear reactors safety is largely based on the results of researches of various coefficients and reactivity effects which are primarily subjected to nuclear and physical properties of fuel, coolant and other materials, as well as to active zone dimensions and configuration.

In the relevant art there exists a reactor BN-800 with an active zone comprising hexagon-shaped fuel assemblies, wherein the middle part of said fuel assemblies contains uranium-plutonium fuel and the end zones contain upper and bottom breeding blankets (Yu. E. Bagdasarov, L. A. Kochetkov et al. The BN-800 reactor—a new step in fast reactor development. IAEA-SM, No. 284/41, vol. 2, p 209-216, 1985). Inside a vessel of the fuel assembly there are rod-type fuel elements (fuel elements), and within a space between fuel elements in the bottom-to-top direction circulates a coolant, namely molten sodium. A disadvantage of such BN-800 reactor in terms of nuclear safety is a high sodium void reactivity effect. This effect significantly compromises nuclear safety of the reactor in emergencies in the result of which sodium boiling or active zone uncovery occurs.

It is known an active zone of a large fast reactor having a central cavity configured to reduce the sodium void reactivity effect up to its minimum value and ensure the safety of transient processes excluding reactor emergency shut-down (Ru 2126558). The active zone according to this invention comprises fuel assemblies mounted in a circumferential direction and defining a large central cavity; a system of control rods, and devises and materials that can enter inside the cavity in order to emergency shut-down the reactor. The invention enables reducing the void reactivity effect by increasing neutron escape through the large cavity in the central part of the active zone under sodium coolant loss or boiling conditions. However, the use of such active zone can lead to an increase in reactor dimensions and to loss of economic performance.

It is known a modified fast sodium reactor having uranium-plutonium fuel (Ru 2029397). An active zone of this reactor, likewise the active zone of the BN-600 reactor, comprises hexagon-shaped fuel assemblies the middle part of which contains uranium-plutonium fuel and the end zones contain upper and bottom breeding blankets. The central part of each fuel assembly comprises a through-cavity having a diameter which is from 0.3 to 0.8 of the effective diameter of the fuel assembly and extending along an entire height of the active zone and breeding blankets. The rest of the fuel elements are arranged inside a fuel assembly vessel, and in a space between fuel elements in the bottom-to-top direction circulates a coolant, namely molten sodium. In emergencies, such fuel assembly configuration promotes a neutron escape from the reactor active zone into end reflectors, thereby reducing the void reactivity effect. Reactivity reduction and increase of neutron escape via the through-cavity in the fuel assemblies is achieved only by removing a considerable number of fuel elements from the fuel assembly central part. Such solution results in a lower reactor power or in a necessity to enhance nuclear fuel enrichment or increase of active zone dimensions.

It is known a lead-cooled fast reactor which comprises an active zone characterized by zonal distribution of uranium-plutonium nitride nuclear fuel along its radius (Ru 2173484). The nuclear fuel is contained in shells of fuel elements, and a gap between the fuel and the shell is filled with a high thermal conductivity material, for example, lead. The fuel elements are arranged into lead-cooled fuel assemblies. The uranium-to-plutonium mass ratio ranges from 5.7 to 7.3 and is uniform across the entire active zone. The fuel in the active zone is radially zoned, and the active zone comprises at least two subzones: a central and a peripheral. The peripheral subzone has more fuel and less coolant than the central subzone. Distribution of the nuclear fuel and the coolant between the subzones is performed by means of changing a pitch between the fuel elements and/or by using in the central and peripheral parts fuel elements of different diameters. The upper parts of the fuel elements comprise gaseous cavities with a height of minimum 0.8 of a fuel column height.

The invention enables to obtain uniform fuel burnup and plutonium breeding rates at the central and peripheral parts of the active zone, lower the temperature difference between the fuel elements and the coolant along the radius and increase the nuclear safety of the reactor in a case of emergency, for example, coolant loss. The configuration of the reactor, the active zone, fuel assemblies and fuel elements described in detail in the invention contemplates further technical solutions, in particular those allowing to lower a reactor reactivity margin to an optimal level, improve heat transfer from the fuel to the fuel element shells, lower thermomechanical interaction of the fuel with the fuel element shells, reduce pressure inside the fuel elements. Zonal distribution of uranium-plutonium nitride fuel and coolant along the active zone radius according to the invention disclosed in the patent Ru 2173484 is provided either by using in the central or peripheral fuel assemblies the fuel elements of different diameters and/or by using different packing density thereof. Thus, in particular, the ratio between diameters of the fuel elements in the fuel assemblies of the peripheral subzones and the fuel elements in the fuel assemblies of the central subzones is equal to 1.12, and the pitch ratio between the fuel elements in the fuel assemblies of the central subzone and between the fuel elements in the fuel assemblies of the peripheral subzone is equal to 1.18. In such way, the practical application of the present invention is driven by a need of nuclear fuel production and use of fuel elements and fuel assemblies of different dimensions resulting in increase of costs for nuclear fuel production.

SUMMARY OF THE INVENTION

The problem addressed by the invention consists in providing an active zone of a lead-cooled high-power fast reactor characterized by a negative or near-zero void reactivity effect and effective power density flattening across the active zone radius.

The above mentioned object is solved by providing an active zone of a lead-cooled high-power fast reactor comprising a homogeneous uranium-plutonium nitride fuel, the mass fraction of which ($\epsilon_m$) is more than 0.305, wherein the fuel is contained within geometrically identical shells of cylindrical fuel elements, the fuel elements are arranged in fuel assemblies which form a central part, an intermediate part and a peripheral part of the active zone, wherein the fuel elements of the fuel assemblies in the central, intermediate and peripheral parts of the active zone have the different heights of a fuel column, and radial distribution of the fuel across the active zone volume is characterized by a stepped shape in its longitudinal section. "Mass fraction of uranium-plutonium nitride fuel ($\epsilon_m$)" as defined in the present invention means the product of its volume ratio in the nuclear reactor active zone and the ration between the density of used fuel ($\rho_u$) and its theoretical density ($\rho_T$), i.e. $\epsilon_m = \epsilon_v \cdot \rho_u / \rho_T$.

According to a particular embodiment of the invention, the diameter of the central part of the active zone is in the range from 0.4 to 0.5 of the effective diameter of the active zone, while the height of the fuel column in the fuel elements of the fuel assemblies in the central part of the active zone is in the range from 0.5 to 0.8 of the height of the fuel column in the fuel elements arranged in the fuel assemblies in the peripheral part of the active zone, and the heights of the fuel columns in the fuel elements in the fuel assemblies forming a stepped intermediate part and arranged within the diameters in the range from 0.5 to 0.85 of the effective diameter of the active zone are selected in the range from 0.55 to 0.9 of the height of the fuel column in the fuel elements arranged in the fuel assemblies in the peripheral part of the active zone.

The inventive configuration of the active zone, as well as of the fuel assemblies and the fuel element can create a basis for production of a reactor with following process inherent safety properties:
 a negative void effect upon changing lead density throughout the entire reactor;
 a negative reactivity coefficient upon changing lead density throughout the entire reactor;
 a significantly reduced coolant density effect within a reactor active zone facilitating improvement of protection in various serious accidents.

The subject-matter of the present invention consists in a specific configuration of the active zone, the central part of which largely influences safety performance of the fast reactor. The inventive fuel distribution in the active zone which has in its longitudinal section a stepped shape with a significantly flattened central part increases a neutron escape and allows for this part to achieve a negative or near-zero positive value of the void effect with certain fuel mass fractions. This effect together with an impact of lateral and end reflectors and a neutron absorber which is mounted at the upper part of the fuel elements provides for obtaining of a negative void effect for the entire reactor.

Increased excess neutron generation in the reactor active zone, as it follows from a neutron balance, is the main "instrument" for reduction of void reactivity effects. Such increased excess neutron generation in the reactor active zone contributes to the extreme reduction of positive void effects for large-volume active zones and even to the obtaining negative void effects for all reactor zones.

In order to increase the excess neutron generation inside the reactor active zone it is used:
 high-density fuel, as well as mono-nitride fuel;
 compositions of active zones characterized by higher fuel fraction, increased diameter of fuel elements, etc.
 flattened geometry of an active zone.

Geometrical dimensions of an active zone primarily define an escape level and void effect values. Having hard neutron spectra, higher fuel fractions in an active zone and, consequently, high excess neutron generation levels in the reactor active zone, as well as neutron economy, the process of escape maximisation for reduction of the void effects can be achieved substantially by geometrical configurations of two types:
 extremely flattened active zones, where relatively large volumes and integral powers can be obtained; and
 modular configurations having relatively small volumes and powers per unit.

According to calculations, all active zones with dense fuel, higher fuel fraction and, consequently, higher neutron generation per fission have substantially reduced void effects.

The embodiment of active zones with dense fuels and dense packings characterized by relatively higher fuel fractions in the active zone, when the whole margin of excess neutrons is used for reduction of the void reactivity effects, is more preferable for guaranteed reduction of the serious accident risk. In order to provide reactors with process inherent safety, the void reactivity effects should be negative and small in absolute magnitude, since large in absolute magnitude negative reactivity effects in certain emergency situations can lead to fast and hazardous positive reactivity introduction.

Achieving critical loading upon reduction of the fuel height in the central part of the active zone is provided by means of increasing the height of the fuel columns from the centre to the peripheral part of the active zone. In the configuration of the active zone according to the present invention, power density flattening is provided by stepped arrangement of the fuel, wherein the steps are created by fuel assemblies of different height of the fuel columns (fuel weight) in the fuel elements. The specific feature of the inventive configuration consists in providing stepped radial distribution of the fuel in the central, intermediate and peripheral parts of the active zone by using in these active zone parts fuel with homogeneously enriched fuel composition and fuel elements and fuel assemblies with identical geometries.

BRIEF DESCRIPTION OF DRAWINGS

FIG. 1 is longitudinal cross-sections of fuel elements which define fuel assemblies in the peripheral, intermediate and central parts of the reactor active zone in accordance with the present invention.

FIG. 2 is a diagram showing nuclear uranium-plutonium fuel distribution in the reactor active zone in accordance with the present invention, which distribution has a stepped shape in a longitudinal section.

EMBODIMENTS OF THE INVENTION

A fuel element of a fuel assembly defining a peripheral part of an active zone (FIG. 1a) consists of a tubular shell 1 with end elements 2 and 3, wherein inside the shell 1 there is uranium-plutonium fuel 4 in the form of a column of height H. An upper part of the fuel element comprises a cavity 5 filled with inert gas. An upper part of the gaseous cavity 5 comprises a neutron absorber, for example, in the form of a tungsten-carbide rod 6 of 5 cm in height, and a structural component for fuel fixation made, for example, in the form of a spring 7.

A fuel element of a fuel assembly defining a central part and an intermediate part of an active zone having in a longitudinal section a stepped fuel distribution (FIG. 1b) consists of a tubular shell 1 with end elements 2 and 3, wherein inside the shell 1 there is uranium-plutonium fuel 4 in the form of a column of fuel pellets of height h. The height h is selected from the range from 0.5 to 0.8 of H for the central part and from 0.55 to 0.9 of H for the intermediate part. An upper part of the fuel element comprises a cavity 5 filled with inert gas. An upper part of the gaseous cavity 5 comprises a neutron absorber, for example, in the form of a tungsten-carbide rod 6 of 5 cm in height, and a structural component for fuel fixation made, for example, in the form of a spring 7.

FIG. 2 is a diagram showing nuclear uranium-plutonium fuel distribution in the active zone, which distribution has a stepped shape in a longitudinal section. When arranging fuel assemblies according to this principle, an intermediate part of the active zone having a diameter from d1 to d2 creates a step and has fuel elements shown in FIG. 1b. The diameter d1 of the central part of the active zone is selected from 0.4 to 0.5 of its effective diameter D. Fuel assemblies of the intermediate part are arranged within the diameter d2, which is selected in the range from 0.5 to 0.85 of the effective diameter D of the active zone and comprises the fuel elements having the fuel column of height h.

According to the present invention, the fuel assemblies and the fuel elements of the active zone together create a stepped shape distribution. The applicant hasn't found any technical solutions that would comprise the features related to establishing the inventive fuel distribution in an active zone which has in its longitudinal section a stepped shape. This solution, in terms of its simplicity and used structures, dramatically differs from the solution of the fuel zonal distribution by changing diameters of fuel elements and a pitch of their arrangement along the active zone radius. Reduction of fuel height in the central part of the active zone results in neutron flux space-and-energy redistribution, increase of neutron escape from the central part of the active zone and, consequently, reduction of a positive constituent of the void reactivity effect. This effect together with an impact of lateral and end reflectors and a neutron absorber which is mounted at the upper part of a gaseous cavity of the fuel element provides for achievement of a negative value of the void effect and for the entire reactor.

Similar to the described above three-step fuel arrangement, an active zone having four and more steps created with fuel assemblies of different fuel height in fuel elements can be embodied. Selection of height of the fuel in the fuel elements of the fuel assemblies in the central part of the active zone impacts the power distribution along its radius. Calculation results show that the stepped fuel distribution in the active zone provides more uniform power distribution along the active zone radius. Different heights of fuel in the rod-type fuel elements in the fuel assemblies which increase stepwise from the active zone centre to its periphery allow reducing the non-uniformity of power distribution along the active zone radius, thus increasing average power density and optimizing fuel load in the active zone.

The example of an embodiment of the active zone of the reactor BP-1200 based on the inventive solution with fuel radial distribution across the active zone volume which has a stepped shape in a longitudinal section. The active zone of the lead-cooled reactor BP-1200 with heat output of 2800 MW and an effective diameter of 576 cm consists of 692 jacket fuel assemblies, each of which comprises 169 fuel elements with uranium-plutonium nitride fuel (having Pu around 14.3%), so that a mass fraction of the fuel in the active zone ($\epsilon_m$) is minimum 0.305. Coolant heating in the active zone is performed at 120° C., and the maximum coolant rate is about 2 m/s. The first step of the central part of the active zone comprises 127 fuel assemblies, each of which is defined by the fuel elements the fuel column height of which is 68 cm. The second step of the central part of the active zone comprises 270 fuel assemblies, each of which is defined by the fuel elements the fuel column height of which is 78 cm. The peripheral part of the active zone comprises 295 fuel assemblies, each of which is defined by the fuel elements the fuel column height of which is 88 cm. All fuel elements of the fuel assemblies in the central, intermediate and peripheral parts of the active zone have the shell external diameter of 10.0 mm and are arranged in a triangular array at a pitch of 13 mm. The ration between the diameter of the central part of the active zone and its effective diameter is 0.404, while the ratio between the fuel heights in the fuel elements of the first and the second steps of the central part of the active zone and the fuel height in its peripheral part is 0.77 and 0.89, respectively.

According to this embodiment of the active zone of the lead-cooled fast reactor with power of 2800 MW, the active zone comprises four jacket fuel assemblies and uses a stepped configuration of fuel load along the radius of said active zone equal to the height of a fuel column for fuel elements having geometrically identical shells; provides power density flattening with a non-uniformity factor along the radius which is no more than 1.27 and the negative void effect for the entire reactor. In this way, the advantages of the inventive configuration of the active zone with stepped fuel distribution along its radius, and the fuel assembly and fuel element configurations intended for creating said active zone allow increasing the safety of the high-power lead-cooled reactor system and providing a base for improvement the performance and economic properties.

The invention claimed is:
1. An active zone of a lead-cooled fast reactor, comprising a homogeneous uranium-plutonium nitride fuel which is contained in geometrically identical shells of cylindrical fuel elements, wherein the fuel elements are arranged in fuel assemblies so that a mass fraction of the fuel in the active zone is a minimum of 0.305, said fuel assemblies create a central part, an intermediate part and a peripheral part of the active zone, wherein a diameter ($d_1$) of the central part of the active zone ranges from 0.4 to 0.5 of an effective diameter (D) of the active zone, while a height ($h_1$) of the fuel column in the fuel elements of the fuel assemblies in the central part of the active zone is from 0.5 to 0.8 of a height (H) of the fuel column in the fuel elements arranged in the fuel assemblies in the peripheral part of the active zone, and a diameter ($d_2$) of the stepped intermediate part of the active zone ranges from 0.5 to 0.85 of the effective diameter (D) of the active zone, while heights ($h_2$) of the fuel columns in the fuel elements in the fuel assemblies forming the stepped intermediate part are from 0.55 to 0.9 of the height of the fuel column in the fuel elements arranged in the fuel assemblies in the peripheral part of the active zone.

\* \* \* \* \*